April 7, 1925.  1,532,882

B. H. CARPENTER

COUPLING FOR ROPE

Filed May 22, 1924

Inventor:
Benjamin H. Carpenter
by Edward F. Allen
atty.

Patented Apr. 7, 1925.

1,532,882

UNITED STATES PATENT OFFICE.

BENJAMIN H. CARPENTER, OF BOSTON, MASSACHUSETTS.

COUPLING FOR ROPE.

Application filed May 22, 1924. Serial No. 715,058.

*To all whom it may concern:*

Be it known that I, BENJAMIN H. CARPENTER, a citizen of the United States of America, and a resident of Boston, in the county of Suffolk and Commonwealth of Massachusetts, have invented certain new and useful Improvements in Couplings for Rope, of which the following is a specification.

This invention relates to couplings, and more particularly to couplings such as might be used in connecting ends of rope, whether of wire or softer material.

An object of the invention is to produce a coupling of this class that is adapted to couple the ends of rope used as driving belts, or in piecing out a length of rope, or as a repair medium in the event of breaks.

It is a further object of the invention to produce a coupling of this class that is simple in make-up, durable, and which may be quickly applied in emergency cases, and readily removed as desired, and which has proved its efficiency.

Heretofore in certain classes of work where rope drives are in use, it has been necessary to connect the ends of the rope by splicing, which is a tedious and time consuming operation, and not always a satisfactory one, as great care had to be taken in making the splice in order to obtain the proper length of belt, and in making a sufficiently strong one for the work in hand.

As rope belts, when new, have a great tendency to stretch, it has heretofore been necessary to break the splice, cut off the desired length, and resplice the rope, which operation actually required the services of a workman skilled in the art of splicing, and which are not always available.

The present invention contemplates a coupling which does not require the services of a skilled workman, but which might be applied by an average man in much less time, and produce a much more accurate length of belt, than by the splicing method above referred to.

The invention will be readily understood from a description of the drawings and the claims hereinafter given.

Of the drawings.

Like characters represent like parts throughout the several figures of the drawing.

Figure 1:
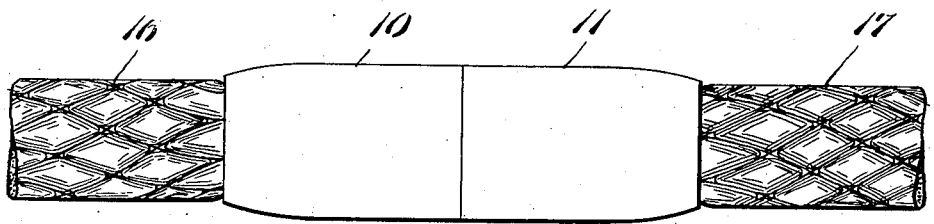
Figure 1 represents in elevation a coupling, embodying the invention, and as applied to a rope to couple the ends thereof.
Figure 2:
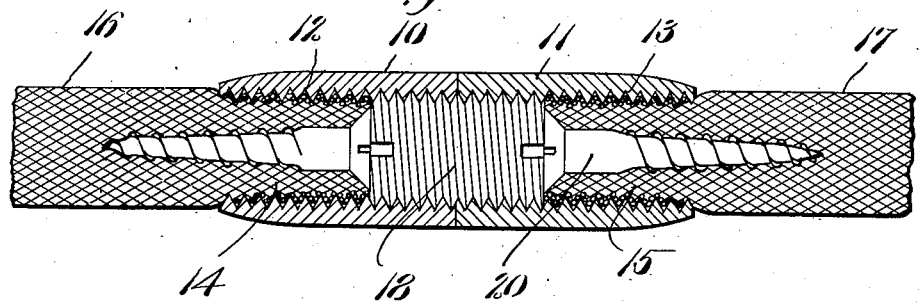
Figure 2 is a longitudinal section through the coupling as seen in Figure 1, some of the parts being shown in elevation.
Figure 3:
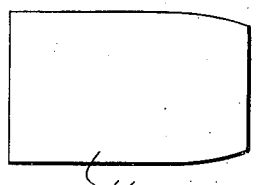
Figure 3 shows an elevation of one of the coupling members detached.
Figure 4:
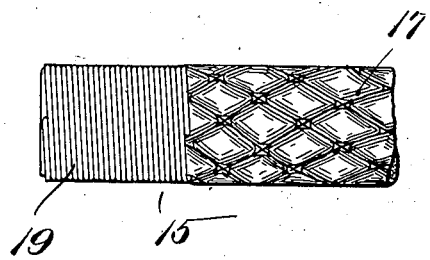
Figure 4 shows an end of a rope with the binding or serving thereon preparatory to inserting into a member such as seen in Figure 3.

Referring to the drawing.

The coupling members 10 and 11 are or may be of a size, shape, and material suitable for the occasion of use, and are internally threaded as at 12 and 13 to receive the ends 14 and 15 of rope leads 16 and 17, and the nipple or plug 18 which is the connecting medium between the said members 10 and 11.

Figure 5:
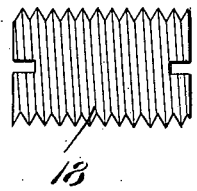
Figure 5 is a view of a plug like member or nipple for connectng the rope end receiving members.

In applying the coupling to use, a rope end is first tightly bound or served with thread or yarn 19, as seen in Figure 5, to thereby stiffen the said end and prepare it to to be received by the screw threads 13 of the member 11 into which it is now ready to be forced by a turning motion.

When the said end has been forced in the member 11 the required distance, it will have been further compressed and tightly occupy its space, and at this time is ready to receive the screw 20 which will be driven firmly into the said end and causing a further compression of the rope material forcing it firmly into the screw threads 13 to such an extent, that separation of the two by longitudinal pull is impossible under ordinary working conditions.

After assembling the member 10, rope end 14, and screw 21, the coupling members are ready to be united by the nipple 18.

In assembling the rope ends with the coupling members, it is preferred that the said ends be made to enter the said members such a distance as to be met, and somewhat compressed by the ends of the nipple 18 when it is secured into place to unite the said members, which arrangement not only more firmly compresses the rope end material, but served to lock all the screw threaded parts together so firmly that it becomes necessary to use tools when the said coupling is to be removed from the rope.

It will be understood that in place of the yarn or thread 19, a soft wire might be used, which would readily take into the threads of the members 10 and 11, facilitating in the assembly of the said members and rope ends, and thereby providing a kind of metallic screw thread for the said rope ends.

Having described the invention I claim:

1. A coupling of the class described having internally threaded, separable body portions; ropes having their ends tightly bound and compressed by a material readily engageable by screw threads, and forced into said body portions; whereby the said ends are further compressed; means to still further compress said ends in said body portions and cause a closer engagement of said ends and said internal threads; and means to unite said body portions.

2. A coupling of the class described having two separable internally threaded body portions, ropes having ends tightly bound and compressed by a serving readily engageable by said threads, the engagement thereof further compressing said ends; a screw firmly driven in said ends whereby they are still further compressed radially thereof, and forced into closer engagement with said threads; and means to unite said body portions.

3. A coupling of the class described having two separable internally threaded body portions adapted to have rope ends inserted therein; means to radially compress a rope end when inserted in a body portion in a manner whereby said end will be forced into said threads, said means including a tapered screw; and a screw threaded closed end connector uniting said portions, and of a length whereby the ends thereof may forcibly contact with said screw and longitudinally compress said inserted ends to thereby cause all the screw threaded parts to become locked.

Signed by me at Boston, Mass., this 13th day of May, 1924.

BENJAMIN H. CARPENTER.